(12) United States Patent
Bataille et al.

(10) Patent No.: US 11,875,465 B2
(45) Date of Patent: Jan. 16, 2024

(54) VIRTUAL REALITY DATA-PROCESSING DEVICE, SYSTEM AND METHOD

(71) Applicants: Orange, Issy-les-Moulineaux (FR); Institut National Des Sciences Appliquees de Rennes, Rennes (FR)

(72) Inventors: Guillaume Bataille, Chatillon (FR); Bruno Arnaldi, Rennes (FR); Valérie Gouranton, Rennes (FR)

(73) Assignees: ORANGE, Issy-les-Moulineaux (FR); INSTITUT NATIONAL DES SCIENCES APPLIQUEES DE RENNES, Rennes (FR)

( * ) Notice: Subject to any disclaimer, the term of this patent is extended or adjusted under 35 U.S.C. 154(b) by 101 days.

(21) Appl. No.: 17/593,542

(22) PCT Filed: Mar. 17, 2020

(86) PCT No.: PCT/EP2020/057357
§ 371 (c)(1),
(2) Date: Sep. 20, 2021

(87) PCT Pub. No.: WO2020/187950
PCT Pub. Date: Sep. 24, 2020

(65) Prior Publication Data
US 2022/0172441 A1      Jun. 2, 2022

(30) Foreign Application Priority Data

Mar. 21, 2019    (FR) ........................................ 1902910
Feb. 13, 2020    (FR) ........................................ 2001408

(51) Int. Cl.
*G06T 19/00*      (2011.01)
*G06F 1/16*       (2006.01)
(Continued)

(52) U.S. Cl.
CPC ............ *G06T 19/006* (2013.01); *G06F 1/163* (2013.01); *G06F 3/011* (2013.01); *G06F 3/0346* (2013.01);
(Continued)

(58) Field of Classification Search
CPC ..................... G06T 19/006; G06T 7/20; G06T 2207/30196; G06F 1/163; G06F 3/011;
(Continued)

(56) References Cited

U.S. PATENT DOCUMENTS 9,990,041 B2 *   6/2018   Levesque ................. G06F 3/016
2013/0113973 A1 *   5/2013   Miao ..................... G02B 27/017
                                                        348/E5.022
(Continued)

FOREIGN PATENT DOCUMENTS

FR    3 068 803    9/2017
FR    3 093 578    3/2019
(Continued)

OTHER PUBLICATIONS

Bataille et al., "A Unified Design & Development Framework for Mixed Interactive Systems", VISIGRAPP 2020—15th International Join Conference on Computer Vision, Imaging and Computer Graphics Theory and Applications, Feb. 2020.
(Continued)

*Primary Examiner* — Ryan R Yang
(74) *Attorney, Agent, or Firm* — David D. Brush; Westman, Champlin & Koehler, P.A.

(57) ABSTRACT

A virtual reality data-processing device, intended to be worn on the head of a user is disclosed. The device renders, in a field of view of the data-processing device, a virtual interaction interface, at least one part of the virtual interaction interface being rendered superimposed on a tangible device, when the tangible device is located in the field of view of the
(Continued)

data-processing device, track at least one body part of the user likely to interact via the virtual interaction interface, detect at least one user interaction on a virtual element of the virtual interaction interface, when the at least one body part of the user is close to or in contact with the tangible device. The development also relates to a system and a method for processing virtual reality data.

15 Claims, 6 Drawing Sheets

(51) Int. Cl.
  *G06F 3/01*     (2006.01)
  *G06F 3/0346*   (2013.01)
  *G06T 7/20*     (2017.01)
(52) U.S. Cl.
  CPC ...... *G06T 7/20* (2013.01); *G06T 2207/30196* (2013.01)
(58) Field of Classification Search
  CPC .... G06F 3/0346; G06F 3/017; G06F 3/04842; G02B 27/017; G02B 2027/0187; G02B 2027/0138
  See application file for complete search history.

(56) References Cited

U.S. PATENT DOCUMENTS

| | | | |
|---|---|---|---|
| 2016/0034039 A1 | 2/2016 | Maeda et al. | |
| 2016/0313902 A1 | 10/2016 | Hill et al. | |
| 2018/0024362 A1 | 1/2018 | Williamson | |
| 2018/0284914 A1* | 10/2018 | Yanai | G06F 3/017 |

FOREIGN PATENT DOCUMENTS

| | | |
|---|---|---|
| FR | 3 104 743 | 12/2019 |
| KR | 10-2015-0109014 | 10/2015 |

OTHER PUBLICATIONS

Bataille et al., "Mixed reality, Natural User Interfaces and the Internet of Things", Article JFIGRV, Nov. 2019.

Coutrix et al., "Mixed Reality: A model of Mixed Interaction", Proceedings of the working conference on Advanced visual interfaces, AVI'06, pp. 43-50, ACM Press, Venezia, Italy, 2006.

Dixon et al., "RAVE: a real and virtual environment for multiple mobile robot systems", Intelligent Robots and systems, 1999, 1ROS'99, Proceedings. 1999 IEEE/RSJ International Conference on Kyongju, South Korea Oct. 17-21, 1999, vol. 3, pp. 1360-1367.

Mohr et al., "TrackCap: Enabling Smartphones for 3D Interaction on Mobile Head-Mounted Displays", CHI 2019, May 4-9, 2019, Glasgow, Scotland, UK.

Notification of Rapport De Recherche Preliminaire for FR 1902910, dated Dec. 17, 2019.

Notification of Rapport De Recherche Internationale for PCT/EP2020/056209, dated May 20, 2020.

Notification of Rapport De Recherche Internationale for PCT/EP2020/057357, dated May 29, 2020.

Notification of Rapport De Recherche Preliminaire for FR 2001408, dated Oct. 5, 2020.

Normand Erwan et al., "Enlarging a Smartphone with AR to Create a Handheld VESAD (Virtually Extended Screen-Aligned Display)", 2018 IEEE International Symposium on Mixed and Augmented Reality (ISMAR), IEEE, Oct. 16, 2018, pp. 123-133.

International Search Report for International Application No. PCT/EP2020/057357, dated May 29, 2020.

International Preliminary Report on Patentability for International Application No. PCT/EP2020/057357, dated Sep. 16, 2021.

* cited by examiner

VIRTUAL REALITY DATA-PROCESSING DEVICE, SYSTEM AND METHOD

CROSS-REFERENCE TO RELATED APPLICATIONS

This application is filed under 35 U.S.C. § 371 as the U.S. National Phase of Application No. PCT/EP2020/057357 entitled "VIRTUAL REALITY DATA-PROCESSING DEVICE, SYSTEM AND METHOD" and filed Mar. 17, 2020, and which claims priority to FR 1902910 filed Mar. 21, 2019, and FR 2001408 filed Feb. 13, 2020, each of which is incorporated by reference in its entirety.

BACKGROUND

Field

The development relates to the field of virtual and mixed reality and in particular user interactions in a virtual/mixed reality environment.

Description of the Related Technology

There are interactive systems mixing real environment and virtual environment. Such systems are called mixed interactive systems (MIS). A model of mixed systems is used by Coutrix et al "*Mixed reality: a model of mixed interaction*" *Proceedings of the working conference on Advanced visual interfaces, AVI'06, p. 43 ACM Press, Venezi, Italy,* 2006, to produce a mixed reality in which a system is composed of mixed objects formed of two parts: a physical or real part described by its physical properties and a digital or virtual part consisting of digital properties. The two real and virtual parts are synchronised such that a modification of a property of the real, respectively virtual, part is reproduced on the corresponding property of the virtual, respectively real, part.

The mixed interactive systems allow mixing the virtual reality, the natural user interfaces and the Internet of Things. The virtual reality synchronises real and virtual worlds and allows interacting simultaneously in these real and virtual worlds. The natural user interfaces use the human body as an interface to deliver natural and intuitive interactions with the digital technologies. For example, such natural interactions are in particular voice commands, or gesture interactions.

The Internet of Things (IoT) provides and enhances interactions with everyday objects.

The convergence of the aforementioned technologies allows bringing closer the real interactions and the virtual interactions. There are already examples of such a convergence. For example, the voice assistants are an example of combining a natural user interface with the Internet of Things.

The virtual reality, in turn, allows providing information about mixed objects of the environment of a user.

However, the convergence of the aforementioned technologies is limited by the lack of dedicated tools to extend this convergence to any connected object, any virtual reality system, and any type of natural user interface.

In addition, it is noted that the user interactions in a virtual reality environment are limited even though these user interactions are implemented by natural gestures of the user. Indeed, during such interactions, the user lacks real feeling.

Haptic systems exist to allow providing a physical feedback to the user following a user interaction in a virtual environment. For example, the user of a virtual reality system may be equipped with gloves with a haptic mechanism providing them with a tactile sensation upon a gesture interaction in the virtual reality environment. However, these mechanisms require the wearing of specific gloves decreasing the natural character a gesture interaction. In addition, the performance of these haptic feedback systems is limited, in particular in modelling the sensation that the user would feel if they had interacted in the real world.

SUMMARY OF CERTAIN INVENTIVE ASPECTS

The development improves the state of the art. It relates to a virtual reality data-processing device, intended to be worn on the head of a user, and configured to:
  render, in a field of view of the data-processing device, a virtual interaction interface, at least one part of said virtual interaction interface being rendered superimposed on a tangible device, when the tangible device is located in the field of view of the data-processing device,
  track at least one body part of the user likely to interact via said virtual interaction interface,
  detect at least one user interaction on a virtual element of said virtual interaction interface, when said at least one body part of the user is close to or in contact with the tangible device.

The device according to the development allows providing a hybrid user interaction mechanism conjugating virtual interaction of the user on virtual elements of a virtual interface and tangible interaction of the user on a physical medium.

Such a device allows improving the sensations felt by the user during interactions in a virtual reality environment, by improving the feeling of immersion in virtual reality. In addition, the use of a virtual interaction interface with a tangible interaction medium allows virtually increasing the display surface, thus allowing displaying more data than on the physical medium.

According to a particular embodiment of the development, the virtual reality data-processing device is further configured:
  to communicate with a real entity of a mixed object comprising said real entity and a virtual entity, said virtual entity of said mixed object being comprised in said virtual interaction interface, and
  to modify or select, depending on said at least one detected user interaction, at least one real data item of said real entity of the mixed object.

The data-processing device according to the particular embodiment above allows providing new services for the use of the connected objects. For example, the connected objects are often limited in terms of displaying data concerning them. The device according to the development allows displaying information or menus relating to the connected object which are not conventionally directly accessible via physical properties of the connected object.

According to another particular embodiment of the development, the data-processing device is further configured to displace the rendered virtual interaction interface depending on a displacement of the tracked body part, such that said virtual element on which said at least one body part interacts is rendered superimposed with the tangible device.

According to this particular embodiment of the development, the virtual interaction interface is displaced relative to the tangible device such that a part of the virtual interface on which the user is likely to interact is placed just above the tangible device. This particular embodiment of the development allows providing a tangible interaction medium, i.e. providing a tactile feedback to the user, even if the virtual interaction interface displays a large number of interaction elements.

According to another particular embodiment of the development, the virtual reality data-processing device is configured to determine a first relative position of the tangible device in a 3D coordinate system of the data-processing device, from a second position of the tangible device in a 3D coordinate system of the tangible device, said second position being received from the tangible device.

According to this particular embodiment of the development, the data-processing device can determine the relative position of the tangible device, even if the tangible device moves, for example in the case of a smartphone held in the hand by the user.

According to another particular embodiment of the development, in order to detect at least one user interaction, the data-processing device is configured to obtain information representative of a contact of the body part of the user with the tangible device, said information representative of a contact being received from the tangible device.

According to another particular embodiment of the development, the virtual interaction interface comprises a plurality of virtual elements representative of a plurality of real data stored in a memory of the tangible device, said at least one user interaction selecting at least one virtual element from the plurality of virtual elements, said selection of said at least one virtual element from the plurality of virtual elements corresponding to a selection of a corresponding real data item in the memory of the tangible device.

According to another particular embodiment of the development, the virtual reality data-processing device is configured to receive from the tangible device, said plurality of real data.

According to another particular embodiment of the development, the real entity of the mixed object is connected to the data-processing device via a data network.

According to this particular embodiment of the development, the real part of the mixed object can be distant from the tangible device and from the data-processing device.

According to another particular embodiment of the development, the virtual interaction interface comprises a virtual representation of a real environment, said real environment comprising at least one connected object, the virtual representation comprising a virtual element representative of said connected object, the virtual element corresponding to the virtual entity of the mixed object and the connected object corresponding to the real entity of the mixed object.

According to this particular embodiment of the development, the system comprises one or more mixed object(s), each real, respectively virtual, part being placed in its real, respectively virtual, environment. The real environment can also be distant from the data-processing device and the tangible device. For example, this particular embodiment of the development allows controlling connected objects which are not accessible, or remote from the user.

The development also relates to a virtual reality data-processing system comprising a virtual reality data-processing device according to any one of the particular embodiments mentioned above, and a tangible device configured to communicate with the virtual reality data-processing device.

According to a particular embodiment of the development, the tangible device corresponds to the real entity of the mixed object.

According to this particular embodiment of the development, the virtual interaction interface and the tangible device form a mixed object in the sense that the virtual interaction interface constitutes the virtual part of the mixed object and the tangible device constitutes the real part of the mixed object.

According to another particular embodiment of the development, the real entity of the mixed object is connected to a communication network, the system further comprises a network server configured to establish communications between the real entity of the mixed object and data-processing device.

This particular embodiment of the development allows applying the system of the development to any type of connected object. Furthermore, the system applies to any type of real object as long as the real object is adapted to be connected to a network, for example via a connected socket.

According to another particular embodiment of the development, said at least one real data item corresponds to a state of the real object. For example, the state of the real object corresponds to an on or off state of the real object.

The development also relates to a method for processing virtual reality data, implemented by the virtual reality data-processing device according to any one of the particular modes mentioned above.

Advantageously, such a method comprises:
  rendering, in a field of view of the data-processing device, a virtual interaction interface, said virtual interaction interface being rendered superimposed on a tangible device, when the tangible device is located in the field of view of the data-processing device,
  tracking at least one body part of the user likely to interact via said virtual interaction interface,
  detecting at least one user interaction on a virtual element of said virtual interaction interface, when said at least one body part of the user is close to or in contact with the tangible device.

According to a particular embodiment of the development, the method further comprises modifying or selecting, depending on said at least one detected user interaction, at least one real data item of a real entity of a mixed object comprising said real entity and a virtual entity, said virtual entity of said mixed object being comprised in said virtual interaction interface.

According to another particular embodiment of the development, the virtual reality data-processing method further comprises determining a displacement of the rendered virtual interaction interface depending on a displacement of the tracked body part, such that said virtual element on which said at least one body part interacts is rendered superimposed with the tangible device.

According to another particular embodiment of the development, the virtual reality data-processing method further comprises determining a first relative position of the tangible device in a 3D coordinate system of the data-processing device, from a second position of the tangible device in a 3D coordinate system of the tangible device, said second position being received from the tangible device.

According to another particular embodiment of the development, the detection of at least one user interaction, comprises obtaining a contact information of the body part of the user with the tangible device, said contact information being received from the tangible device.

The development also relates to a computer program including instructions for implementing the virtual reality data-processing method according to any one of the previously described particular embodiments, when said program is executed by a processor. Such a program can use any programming language. It can be downloaded from a communications network and/or recorded on a computer readable medium. This program can use any programming language, and be in the form of source code, object code, or intermediate code between source code and object code, such as in a partially compiled form, or in any other desirable shape.

According to yet another aspect, a computer-readable recording medium or information medium is proposed, which comprises instructions of a computer program as mentioned above. The aforementioned recording media can be any entity or device capable of storing the program. For example, the medium may include storage means, such as a memory of the Read-Only Memory (ROM) type, for example a CD-ROM or a microelectronic circuit ROM, a flash memory mounted on a removable storage medium, such as a USB key, or else a magnetic mass memory of the Hard-Disk Drive (HDD) or Solid-State Drive (SSD) type, or a combination of memories operating according to one or more data recording technologies. On the other hand, the recording media can correspond to a transmissible medium such as an electrical or optical signal, which can be conveyed via an electrical or optical cable, by radio or by other means. In particular, the proposed computer program can be downloaded over an Internet-type network.

Alternatively, the recording media can correspond to an integrated circuit in which the program is incorporated, the circuit being adapted to execute or to be used in the execution of the method in question.

The virtual reality data-processing method according to the development can therefore be implemented in various manners, in particular in hardware form or in software form, or be implemented in the form of a combination of hardware and software elements.

BRIEF DESCRIPTION OF THE DRAWINGS

Other features and advantages of the development will appear more clearly on reading the following description of a particular embodiment, given by way of simple illustrative and non-limiting example, and the appended drawings, among which.

DETAILED DESCRIPTION OF CERTAIN ILLUSTRATIVE EMBODIMENTS

Figure 1:
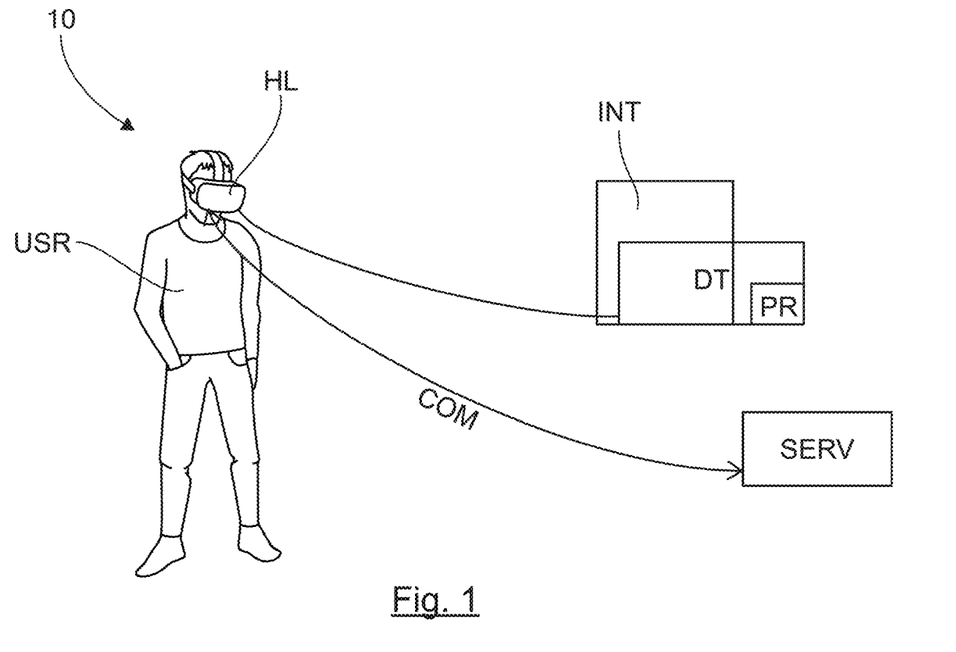
FIG. 1 illustrates an example of an implementation environment of the development according to a particular embodiment of the development.

FIG. 1 illustrates an example of an implementation environment 10 of the development according to a particular embodiment of the development. The environment 10 comprises in particular a user USR equipped with a virtual reality data-processing device HL. For example, the virtual reality data-processing device HL is a virtual reality headset worn on the user's head, such as a Hololens headset from Microsoft© Corporation. The environment also comprises a tangible device DT configured to communicate with the data-processing device HL.

Figure 3:
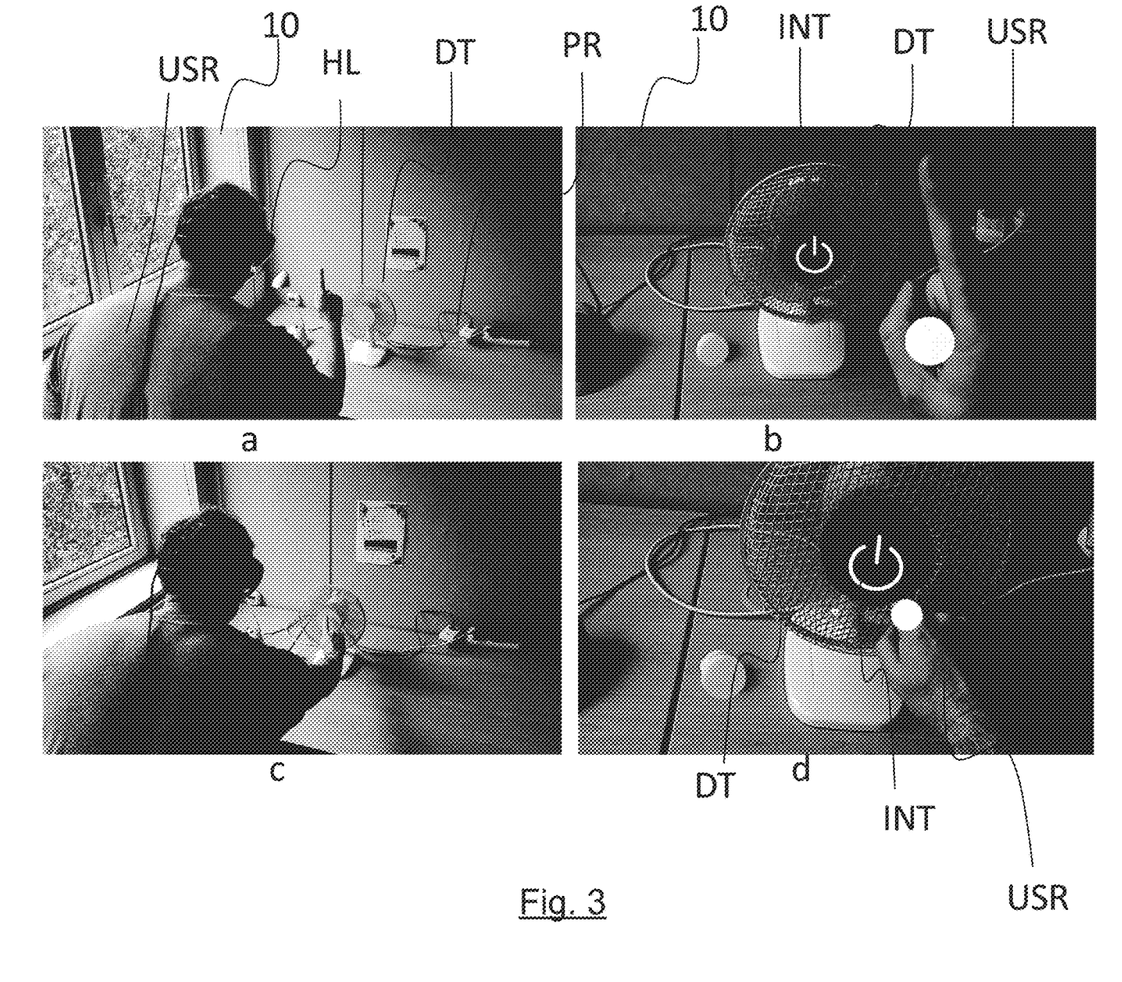
FIG. 3 illustrates an example of user interaction in the implementation environment described in relation to FIG. 1.

In the example described herein, the tangible device is a real object such as a fan (FIG. 3). However, the example is not limited to such a tangible device which can also be a light bulb, a thermometer, a presence detector or any other type of home automation object. In order to allow the tangible device DT to communicate with the data-processing device HL, the tangible device DT comprises a connected socket PR connected to a server SERV of the environment 10. The server SERV and the data-processing device HL are configured to establish communications via a wireless connection, for example in Bluetooth or WiFi.

The data-processing device HL, the tangible device DT and the server SERV form a data-processing system within the meaning of the development.

According to this particular embodiment of the development, the data-processing device HL is configured to display to the user a virtual interaction interface INT associated with the tangible device. FIG. 3 illustrates an example of user interaction in the implementation environment described in relation to FIG. 1.

More particularly, in the example described herein, the virtual interaction interface INT comprises a virtual element (virtual switch in images 3b and 3d) on which the user can interact to modify a state of the tangible device DT.

According to the particular embodiment of the development described herein, the tangible device DT is a mixed object comprising a real entity, herein the real object, and a virtual entity corresponding to a digital representation of the real object by the data-processing device HL. In the example described herein, the virtual entity of the mixed object can be the virtual element of the virtual interaction interface INT.

In the example described herein, when the user interacts on the virtual interaction interface, the virtual state of the virtual representation of the tangible device is modified and the real state of the tangible device is modified. The state of the tangible device herein corresponds to an off/on state.

In order to improve the user's feeling upon a user interaction on the virtual interaction interface, as illustrated in FIG. 3 (images b, d), the virtual interaction interface INT is rendered to the user superimposed on the tangible device DT, such that when the user interacts on the virtual interaction interface NT (FIG. 3 image c), they are in contact with the tangible device DT (FIG. 3 image d).

For this purpose, the data-processing device HL detects the collision between the virtual representation of the user's hand USR and the virtual switch of the tangible device. In FIG. 3 image d, the virtual switch is displayed above the surface of the tangible device DT. When the user touches the virtual switch, they also touch the tangible surface of the tangible device DT, making the virtual part of the mixed object/tangible device DT tangible.

Figure 2:
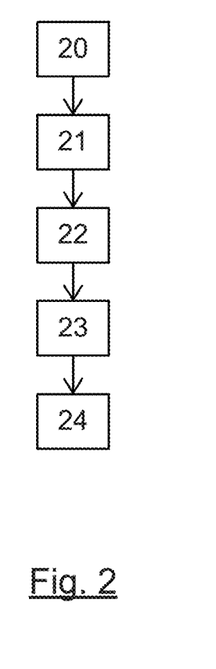
FIG. 2 illustrates steps of the virtual reality data-processing method according to a particular embodiment of the development.

FIG. 2 illustrates steps of the virtual reality data-processing method according to the particular embodiment of the development described in relation to FIG. 1. The virtual reality data-processing method is implemented by the data-processing device HL described in relation to FIG. 1.

During a step 20, the data-processing device HL determines the relative position of the tangible device DT in the 3D coordinate system thereof.

In the particular embodiment of the development described herein, it is considered that the tangible device DT is fixed in the environment 10. The position of the tangible device DT in the environment 10 is obtained by the data-processing device HL by detecting in the real environment 10, the pose of a predefined texture whose location is known in the virtual representation of the environment 10 implemented by the data-processing device HL.

During a step 21, the data-processing device HL renders to the user a virtual interaction interface. This virtual interface is rendered in the field of view of the data-processing device. Advantageously, the virtual interaction interface is rendered to the user, superimposed on the tangible device DT, when the tangible device is located in the field of view of the data-processing device. In other words, when the user sees the tangible device DT via the data-processing device HL, the virtual interaction interface INT is rendered to the user above the tangible device DT.

During a step 22, at least one body part of the user likely to interact via the virtual interaction interface INT is tracked by the data-processing device HL. In the example described in relation to FIGS. 1a-d, the user's hand is tracked by the data-processing device HL.

During a step 23, when the tracked body part of the user URS is close to or in contact with the tangible device DT, the data-processing device HL detects a user interaction on a virtual element of the virtual interaction interface INT.

During a step 24, depending on a detected user interaction, the state of the tangible device, corresponding for example to an on or off state of the tangible device, is modified. For this, the data-processing device HL modifies the virtual state of the virtual representation of the tangible device. This modification is transmitted via the connection COM to the server which modifies the state of the switch of the socket PR. The real state of the tangible device is thus modified via the change of state of the socket PR.

Figure 4:
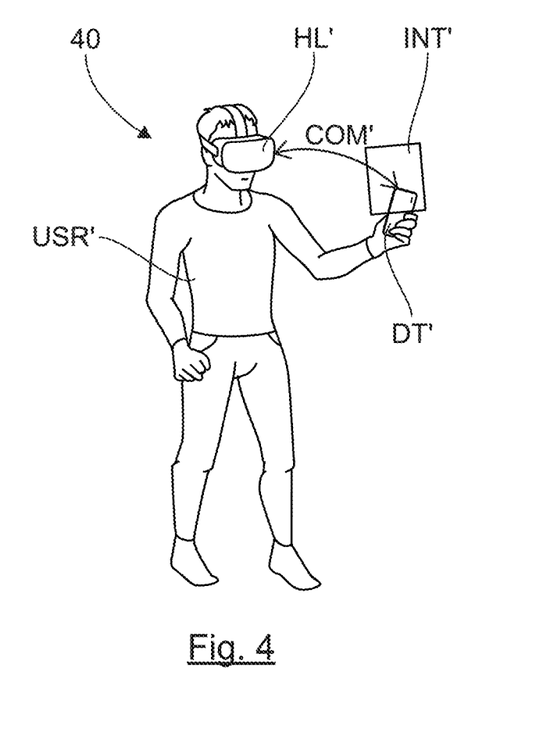
FIG. 4 illustrates an example of an implementation environment of the development according to another particular embodiment of the development.

FIG. 4 illustrates an example of an implementation environment 40 of the development according to another particular embodiment of the development.

The environment 40 comprises in particular a user USR' equipped with a virtual reality data-processing device HL', for example a virtual reality headset worn on the user's head. The environment also comprises a tangible device DT' configured to communicate with the data-processing device HL'. In the example described herein, the tangible device DT' is a mobile terminal, for example a smartphone.

The tangible device DT' and the Data-processing device HL' are configured to establish communications via a wireless connection COM', for example Bluetooth or WiFi. In particular, the tangible device DT' and the data-processing device HL' are configured to exchange their relative position in their respective 3D coordinate system.

The data-processing device HL', the tangible device DT' form a data-processing system within the meaning of the development.

According to the particular embodiment of the development described herein, the data-processing device HL' is configured to display to the user a virtual interaction interface INT' associated with the tangible device DT'.

Figure 6:
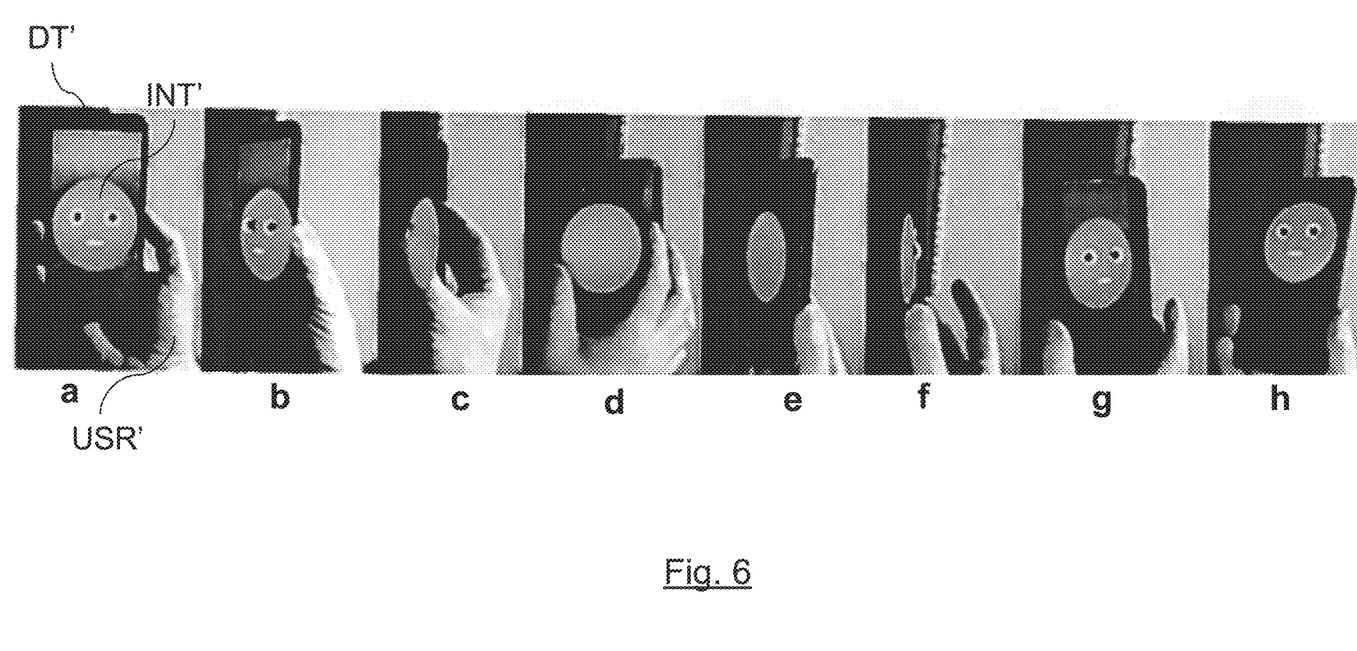
FIG. 6 illustrates an example of a virtual interaction interface according to the particular embodiment of the development described in relation to FIG. 4.
Figure 7:
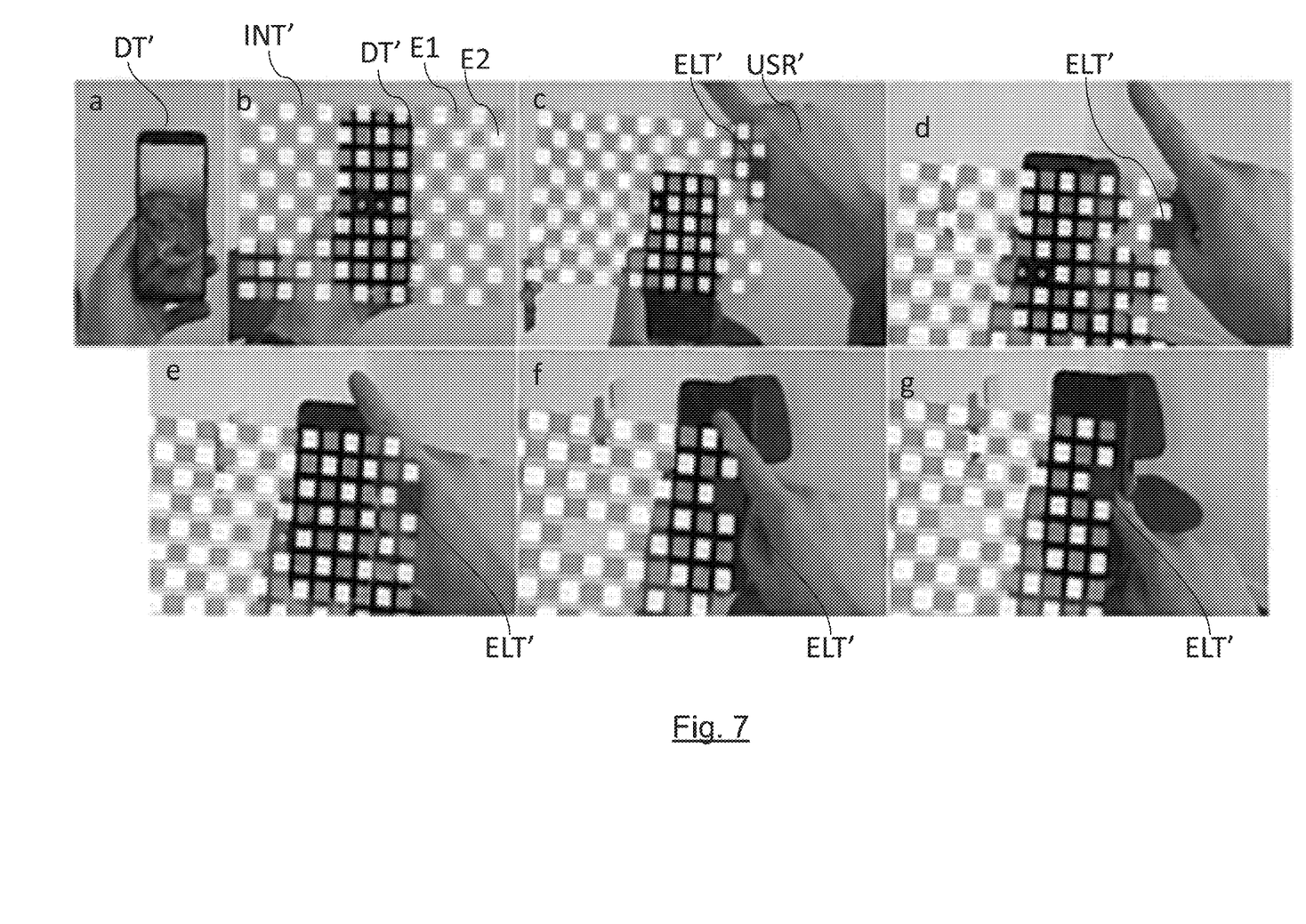
FIG. 7 illustrates an example of user interaction in the implementation environment described in relation to FIG. 4.

More particularly, and as illustrated in FIGS. 6 and 7, the virtual interaction interface INT' is rendered to the user superimposed on the tangible device DT', such that when the user interacts on the virtual interaction interface INT' (FIG. 7 images f, g), they are in contact with the tangible device DT'.

For this purpose, as in the example described in relation to FIG. 1, the data-processing device HL' detects the collision between the virtual representation of the hand of the user USR' and a virtual element ELT of the virtual interaction interface INT'.

According to the particular embodiment of the development described herein, the tangible device DT' is a mixed object comprising a real entity, herein the smartphone, and a virtual entity corresponding to a digital representation of the smartphone by the data-processing device HL'.

Figure 5:
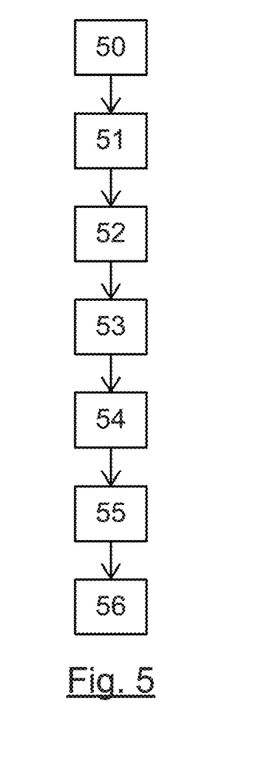
FIG. 5 illustrates steps of the virtual reality data-processing method according to the particular embodiment of the development described in relation to FIG. 4.

FIG. 5 illustrates steps of the virtual reality data-processing method according to the particular embodiment of the development described in relation to FIG. 4. The virtual reality data-processing method is implemented by the data-processing device HL' described in relation to FIG. 4.

During a step 50, the data-processing device HL' determines the relative position of the tangible device DT' in the 3D coordinate system thereof.

For this purpose, the data-processing device HL' determines a relative position of the tangible device DT' in the 3D coordinate system of the data-processing device DT', from a position of the tangible device DT' transmitted by the device tangible DT'. This transmitted position of the tangible device DT' corresponds to the relative position of the tangible device DT' in the 3D coordinate system thereof.

In the particular embodiment of the development described herein, the tangible device DT' is held in the hand by the user and can therefore move. The data-processing device HL then calculates a passage matrix between the two 3D coordinate systems.

For this purpose, the data-processing device HL' has its own pose (position and orientation) in its own 3D coordinate system, for example via a dedicated component of the SLAM type (for "Simultaneous Localization And Mapping") integrated in the data-processing device HL'. Likewise, the tangible device DT' has its own pose in its own 3D coordinate system, for example using a dedicated integrated component such as ARCore SLAM from the company Google©. The tangible device DT' continuously transmits its position and its orientation to the data-processing device HL'. The two 3D coordinate systems (that of the data-processing device HL' and that of the tangible device DT') are synchronised when the data-processing device HL' calculates the pose of the tangible device DT' in the 3D coordinate system of the data-processing device HL'. For this, the tangible device DT' displays a texture which is determined and known to the data-processing device HL'. When the data-processing device HL' detects, using the camera(s) thereof, the texture displayed by the tangible device DT', the data-processing device HL' calculates the transformation matrix of the tangible device DT'. For example, the data-processing device HL' may comprise a computer vision software module to recognise and track real-time 3D images and objects, such as the VuForia software.

A passage matrix is then determined from the transformation matrix of the tangible device DT'. Such a passage matrix defines a common 3D coordinate system for the positions of the data-processing device HL' and the tangible device DT'. The sum of the position of the data-processing device HL' and the pose of the tangible device DT' estimated by the data-processing device HL' is compared with the position of the tangible device DT' estimated by itself to provide the passage matrix.

The data-processing device HL' continuously determines in the 3D coordinate system thereof, the position of the virtual representation of the tangible device DT' from the relative position transmitted by the tangible device DT' and the passage matrix.

During a step 52, the data-processing device HL' renders a virtual interaction interface INT' to the user. This virtual interface INT' is rendered in the field of view of the data-processing device, superimposed on the tangible device DT', when the tangible device is located in the field of view of the data-processing device.

As the tangible device DT' can be manipulated and displaced, when the tangible device DT' is displaced, the virtual interaction interface INT' is rendered by the data-processing device HL' by tracking the movements of the tangible device DT'. This operation is for example illustrated in FIG. 6.

In FIG. 6, the virtual interface INT' takes the form of a virtual face displayed superimposed on the surface of the tangible device DT'. The successive images in FIG. 6 illustrate the displacement of the virtual interface INT' following the movements of the tangible device DT'.

FIG. 7 also illustrates an example of user interaction according to the particular embodiment of the development described herein. According to this example, the virtual interaction interface INT' comprises a plurality of virtual elements (E1, E2, . . . ) represented in FIG. 7 by white or grey squares. This plurality of virtual elements is representative of a plurality of real data stored in a memory of the tangible device DT'. In order to be able to display such a virtual interaction interface NT', during a step 51, the data-processing device HL' receives from the tangible device DT' data representative of this plurality of real data. For example, the real data herein correspond to contacts stored in the memory of the smartphone DT'.

Each virtual element of the virtual interaction interface INT' displayed in images b to g in FIG. 7 corresponds to a contact stored in the smartphone DT'.

During a step 53, at least one body part of the user likely to interact via the virtual interaction interface NT' is tracked by the data-processing device HL'. In the example described in relation to FIG. 7 images a to g, the hand of the user USR' is tracked by the data-processing device HL'.

In a step 54, the virtual interaction interface INT' is rendered to the user by tracking the displacement of the tracked body part, herein the hand of the user USR'. This allows a virtual element ELT', on which the body part of the user interacts, to be rendered superimposed with the tangible device DT'.

The succession of the images b to g of FIG. 7 illustrates such a displacement of the virtual interaction interface INT' with the hand of the user USR'. Initially (image b of FIG. 7), the virtual interaction interface INT' is rendered in a centred manner relative to the tangible device DT' appearing in the field of view of the data-processing device HL'. When the user's hand, and more particularly their outstretched finger, is displaced upwards, the virtual interaction interface INT' is displaced upwards (FIG. 7 image c). When the user's outstretched finger goes down, the virtual interaction interface INT' goes down (FIG. 7 image d). In the image e of FIG. 7, the user's finger gets closer to the tangible device DT', indicating that the user is likely to interact on a virtual element ELT' located in this zone of the virtual interface INT'. The data-processing device HL' determines the virtual element ELT' on which the user is likely to interact, depending on the position of the finger relative to the virtual interaction interface NT'. This element ELT' is visually rendered larger to indicate to the user on which element they will interact.

When the user's finger still gets closer to the tangible device DT', the virtual interaction interface INT' is displaced such that the virtual element ELT' on which the user wishes to interact is placed above the surface of the tangible device DT' (image f in FIG. 7).

During a step 55, when the tracked body part of the user USR is close to or in contact with the tangible device DT', the data-processing device HL' detects a user interaction on the virtual interaction interface NT' corresponding herein to a selection of the virtual element ELT' by the user.

In image g of FIG. 7, when the user interacts with the virtual element ELT', the user's finger comes into contact with the tangible device DT'.

In order to detect the user interaction, the data-processing device HL' detects the virtual representation of the user's hand or finger and focuses on the virtual element closest to the virtual representation of the user's hand or finger. In step 55, when the user touches the surface of the tangible device DT', for example herein the touch screen of the smartphone, the tangible device DT' detects the contact of the user's finger on this surface. The tangible device DT' transmits this contact information to the data-processing device HL' which can then use it to validate the detection of the user interaction in its virtual representation.

During a step 56, the contact stored in the memory of the tangible device DT' and corresponding to the virtual element ELT' on which the user has interacted is selected.

For this, the data-processing device HL' transmits, to the tangible device DT', information indicating the selection of the contact associated with the virtual element ELT'. The user can then act on this contact, for example issuing a call, sending a message, etc.

Figure 8:
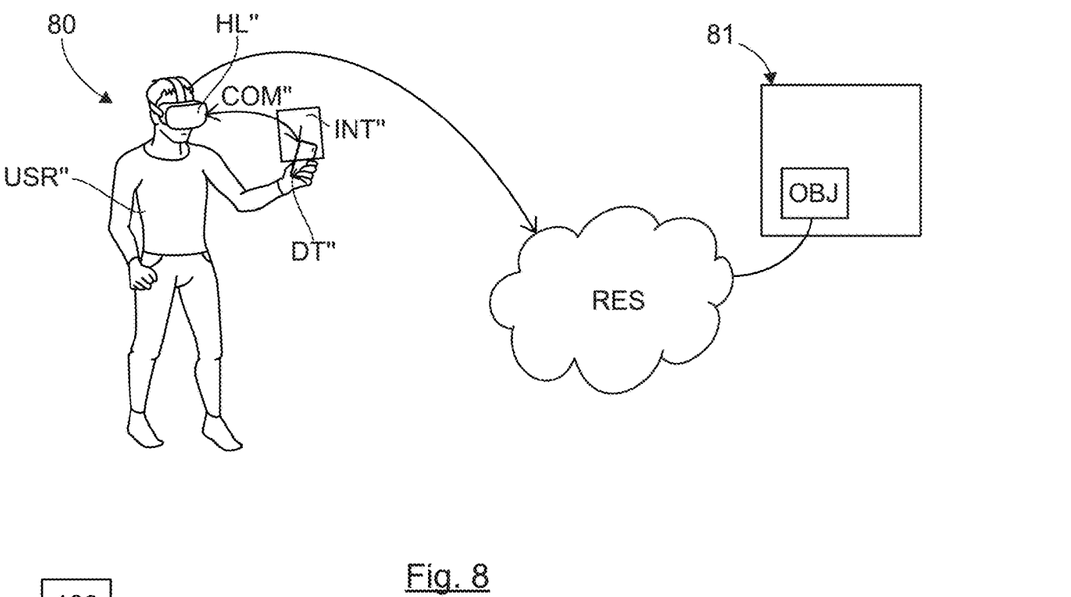
FIG. 8 illustrates an example of an implementation environment of the development according to another particular embodiment of the development.

FIG. 8 illustrates an example of an implementation environment 80 of the development according to another particular embodiment of the development. The environment 80 comprises in particular a user USR" equipped with a virtual reality data-processing device HL", for example a virtual reality headset worn on the user's head. The environment also comprises a tangible device DT" configured to communicate with the data-processing device HL". In the example described herein, the tangible device DT" is a mobile terminal, for example a smartphone.

The tangible device DT" and the data-processing device HL" are configured to establish communications via a wireless connection COM", such as Bluetooth or WiFi. In particular, the tangible device DT" and the data-processing device HL" are configured to exchange their relative positions in their respective 3D coordinate system.

The data-processing device HL", the tangible device DT" forms a data-processing system within the meaning of the development.

According to the particular embodiment of the development described herein, the data-processing device HL" is configured to display to the user a virtual interaction interface INT" associated with the tangible device DT". For example, such a virtual interaction interface INT" comprises a virtual representation of a real environment 81 in which one or more connected real object(s) are placed.

In the example of FIG. 8, the real environment 81 includes a connected object OBJ configured to communicate via a data network RES with the data-processing device HL".

The environment 80 illustrated in FIG. 8 thus comprises a mixed object whose real parts corresponds to the connected object OBJ and the virtual part corresponds to a virtual element rendered in the virtual representation of the real environment 81 displayed by the virtual interaction interface NT".

Figure 9:
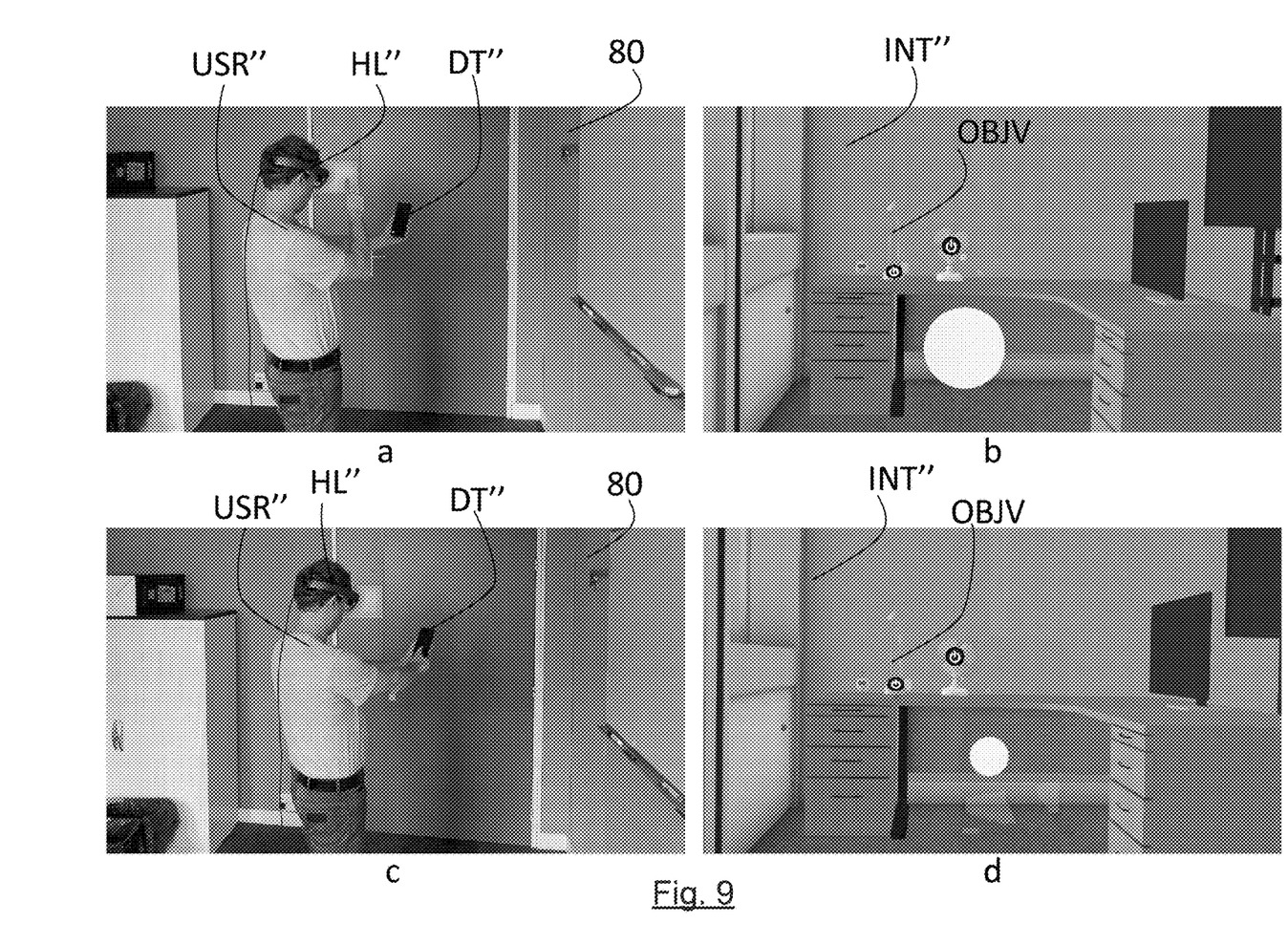
FIG. 9 illustrates an example of user interaction in the implementation environment described in relation to FIG. 8.

FIG. 9 illustrates the environment 80 (images a and c) and the virtual representation of the environment 81 displayed by the virtual interaction interface INT" (images b and d).

Advantageously, the virtual interaction interface INT" is rendered to the user superimposed on the tangible device DT", such that when the user interacts on the virtual interaction interface INT" (FIG. 9 image c), their finger is in contact with the tangible device DT". For this, as in the example described in relation to FIG. 1, the data-processing device HL" detects the collision between the virtual representation of the hand of the user USR" and a virtual element of the virtual interaction interface INT". According to the particular embodiment described herein, when the user interacts on a virtual element of the virtual interaction interface INT" which is associated with a mixed object of the environment 80, a data item of the real part of the mixed object is modified. For example, in the example of FIG. 9, the on/off state of the object OBJ is modified.

In the example described in relation to FIG. 9, the tangible device DT" is held in the hand by the user USR" of the data-processing device HL". The virtual interaction interface INT" is associated with the tangible device DT" by the data-processing device HL" such that a movement of the tangible device DT" by the user causes a corresponding movement of the display of the virtual interaction interface INT" as already described in relation to FIG. 6.

It should be noted that according to this particular embodiment of the development, the tangible device DT" is also a mixed object of the environment 80. Indeed, the tangible device DT" corresponds to the real part of the mixed object and the data-processing device HL" has a virtual representation of the tangible device DT" in its virtual representation of the environment 80 in order to be able to display the virtual interaction interface INT" in association with the tangible device DT". In addition, it is seen that the real movement of the tangible device DT" causes a movement of the virtual representation of the tangible device DT" in the virtual representation of the environment 80 of the processing device HL". It should be noted herein that the virtual representation of the tangible device DT" is not displayed to the user.

According to the particular embodiment described herein, the user interaction combines two user interfaces: the data-processing device HL" implementing the virtual interaction interface NT" and the tangible device DT". The tangible device DT" is used as a tangible and tactile interface and as a device for monitoring the manipulations of the virtual representation of the real environment 81 by the user. The tangible device DT" is not used herein as a visual rendering device. It serves as a physical rendering medium. The tangible device DT" allows tangibly manipulating the virtual representation of the real environment 81 displayed via the virtual interaction interface by manipulating the tangible device itself.

Figure 10:
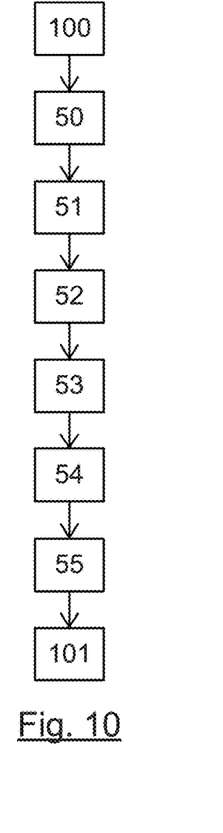
FIG. 10 illustrates steps of the virtual reality data-processing method according to the particular embodiment of the development, described in relation to FIGS. 8 and 9, FIG. 11 schematically illustrates the structure of a virtual reality data-processing device according to a particular embodiment of the development.

FIG. 10 illustrates steps of the virtual reality data-processing method according to the particular embodiment of the development described in relation to FIGS. 8 and 9.

During a step 100, a virtual representation of the real environment 81 is created. For example, it can be created manually by the user using an appropriate virtual reality software or else using the data-processing device HL" placed in the environment 81.

The data-processing device HL" then implements steps 50 to 55 which are identical to those described in relation to FIG. 5 and are not described in more detail. The only difference comes from the virtual interaction interface INT" which comprises herein the virtual representation of the real environment 81.

Thus, according to the particular embodiment described herein, the user can view a virtual representation of a real environment even though they are not located in this real environment.

It is assumed herein that during step 55, the user has interacted on the virtual element OBJV representative of the mixed object OBJ of the environment 81.

Following step 55 of detecting the user interaction on the virtual element OBJV, during a step 101, the data-processing device HL" transmits to the real part of the mixed object OJB a command of modification of the state of the mixed object OBJ. For example, if the mixed object OBJ is a connected lamp and that its state was "on" before the user interaction, sending the state modification command causes the switch to the "off" state of the lamp.

Figure 11:
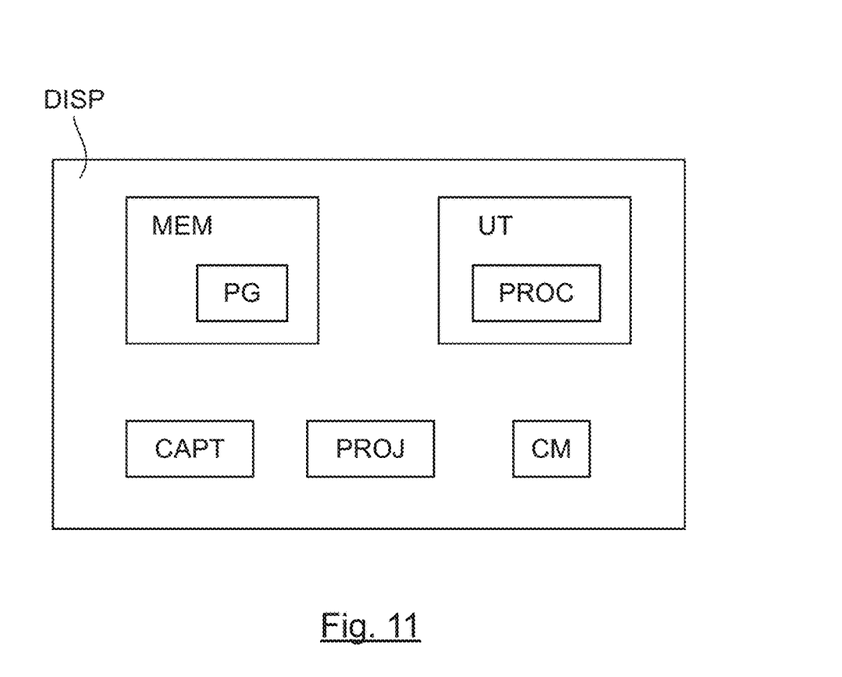

FIG. 11 schematically illustrates the structure of a virtual reality data-processing device DISP according to a particular embodiment of the development. Such a virtual reality data-processing device DISP is adapted to implement the data-processing method according to any one of the particular modes described in relation to FIGS. 2, 5 and 10.

In particular, the device DISP is a portable optical display device, such as a virtual reality headset through which the headset user can see the real world.

In the non-limiting example illustrated in FIG. 11, the virtual reality data-processing device DISP comprises a memory MEM, a processing unit UT, equipped for example with a processor PROC, and controlled by the computer program PG stored in the memory MEM. The computer program PG comprises instructions for implementing the steps of the data-processing method, when the program is executed by the processor PROC.

On initialisation, the code instructions of the computer program PG are for example loaded into a memory before being executed by the processor PROC. The processor PROC of the processing unit UT in particular implements the data-processing method according to any one of the embodiments described above according to the instructions of the computer program PG.

For this purpose, the virtual reality data-processing device DISP comprises a position detector CAPT configured to detect the position of the head and hands of a user who is wearing the portable device DISP.

The virtual reality data-processing device DISP also comprises a projection device PROJ allowing visually rendering a virtual interaction interface to the user, for example via a holographic projection technique.

The virtual reality data-processing device DISP also comprises a transmitter/receiver or communication module CM allowing the device DISP to communicate with at least one connected object and/or a tangible device, such as a mobile terminal.

According to a particular embodiment of the development, the previously described virtual reality data-processing device DISP is comprised in a terminal, for example an augmented reality headset.

The invention claimed is:

1. A virtual reality data-processing device, intended to be worn on the head of a user, wherein the data-processing device is configured to:
    render, in a field of view of the data-processing device, a virtual interaction interface that allows the user to change a state of a tangible device, at least one part of the virtual interaction interface being rendered superimposed on the tangible device, in response to the tangible device being located in the field of view of the data-processing device;
    track at least one body part of the user likely to interact via the virtual interaction interface; and
    detect at least one user interaction on a virtual element of the virtual interaction interface, while detecting that the at least one body part of the user is close to or in contact with the tangible device.

2. The virtual reality data-processing device according to claim 1, wherein the virtual reality data-processing device is further configured to:
    communicate with a real entity of a mixed object comprising the real entity and a virtual entity, the virtual entity of the mixed object being comprised in the virtual interaction interface, and
    modify or select, depending on the at least one detected user interaction, at least one real data item of the real entity of the mixed object.

3. The virtual reality data-processing device according to claim 1, further configured to displace the rendered virtual interaction interface depending on a displacement of the tracked body part, such that the virtual element on which the at least one body part interacts is rendered superimposed with the tangible device.

4. The virtual reality data-processing device according to claim 1, further configured to determine a first relative position of the tangible device in a 3D coordinate system of the data-processing device, from a second position of the tangible device in a 3D coordinate system of the tangible device, the second position being received from the tangible device.

5. The virtual reality data-processing device according to claim 1, wherein in order to detect at least one user interaction, the data-processing device is configured to obtain information representative of a contact of the body part of the user with the tangible device, the information representative of a contact being received from the tangible device.

6. The virtual reality data-processing device according to claim 1, wherein the virtual interaction interface comprises a plurality of virtual elements representative of a plurality of real data stored in a memory of the tangible device, the at least one user interaction selecting at least one virtual element from the plurality of virtual elements, the selection of the at least one virtual element from the plurality of virtual elements corresponding to a selection of a corresponding real data item in the memory of the tangible device.

7. The virtual reality data-processing device according to claim 6, further configured to receive from the tangible device, the plurality of real data.

8. The virtual reality data-processing device according to claim 1, wherein a real entity of the mixed object is connected to the data-processing device via a data network.

9. The virtual reality data-processing device according to claim 8, wherein the virtual interaction interface comprises a virtual representation of a real environment, the real environment comprising at least one connected object, the virtual representation comprising a virtual element representative of the connected object, the virtual element corresponding to a virtual entity of the mixed object and the connected object corresponding to the real entity of the mixed object.

10. A virtual reality data-processing system comprising the virtual reality data-processing device according to claim 1, and the tangible device, which is configured to communicate with the virtual reality data-processing device.

11. The virtual reality data-processing system according to claim 10, wherein the virtual reality data-processing device is further configured to communicate with a real entity of a mixed object comprising the real entity and a virtual entity, the virtual entity of the mixed object being comprised in the virtual interaction interface, and modify or select, depending on the at least one detected user interaction, at least one real data item of the real entity of the mixed object, and wherein the tangible device corresponds to the real entity of the mixed object.

12. A method for processing virtual reality data, implemented by a virtual reality data-processing device intended to be worn on the head of a user, the method comprising:
    rendering, in a field of view of the data-processing device, a virtual interaction interface that allows the user to change a state of a tangible device, the virtual interaction interface being rendered superimposed on the tangible device, in response to the tangible device being located in the field of view of the data-processing device,
    tracking at least one body part of the user likely to interact via the virtual interaction interface, and
    detecting at least one user interaction on a virtual element of the virtual interaction interface, while detecting that the at least one body part of the user is close to or in contact with the tangible device.

13. The virtual reality data-processing method according to claim 12, further comprising modifying or selecting, depending on the at least one detected user interaction, at least one real data item of a real entity of a mixed object comprising the real entity and a virtual entity, the virtual entity of the mixed object being comprised in the virtual interaction interface.

14. The virtual reality data-processing method according to claim 12, further comprising determining a displacement of the rendered virtual interaction interface depending on a displacement of the tracked body part, such that the virtual element on which the at least one body part interacts is rendered superimposed with the tangible device.

15. A non-transitory computer storage medium, storing instructions of a computer program, causing implementing the data-processing method according to claim 12, when the program is executed by a processor.

* * * * *